(12) United States Patent
Wang et al.

(10) Patent No.: US 10,862,708 B2
(45) Date of Patent: Dec. 8, 2020

(54) INTEROPERABILITY BETWEEN SEPARATE AND COLLAPSED SERVICE-LAYER AND TRANSPORT-LAYER TUNNELS

(71) Applicant: Juniper Networks, Inc., Sunnyvale, CA (US)

(72) Inventors: Lili Wang, Andover, MA (US); Kaliraj Vairavakkalai, Fremont, CA (US); Natrajan Venkataraman, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/368,818

(22) Filed: Mar. 28, 2019

(65) Prior Publication Data
US 2020/0295969 A1    Sep. 17, 2020

Related U.S. Application Data

(60) Provisional application No. 62/818,532, filed on Mar. 14, 2019.

(51) Int. Cl.
| | |
|---|---|
| *H04L 12/46* | (2006.01) |
| *H04L 12/751* | (2013.01) |
| *H04L 29/08* | (2006.01) |
| *H04L 29/06* | (2006.01) |

(52) U.S. Cl.
CPC ...... *H04L 12/4633* (2013.01); *H04L 12/4641* (2013.01); *H04L 45/02* (2013.01); *H04L 69/16* (2013.01); *H04L 69/325* (2013.01); *H04L 69/326* (2013.01)

(58) Field of Classification Search
CPC . H04L 12/4633; H04L 12/4641; H04L 45/02; H04L 69/16; H04L 69/325; H04L 69/326
See application file for complete search history.

(56) References Cited

U.S. PATENT DOCUMENTS

| | | | |
|---|---|---|---|
| 9,983,860 B1* | 5/2018 | Koty | H04L 67/10 |
| 2004/0059831 A1* | 3/2004 | Chu | H04L 41/0893 709/242 |
| 2008/0170578 A1* | 7/2008 | Ould-Brahim | H04L 12/4641 370/401 |
| 2015/0089629 A1* | 3/2015 | Gu | H04L 45/507 726/15 |
| 2016/0112255 A1* | 4/2016 | Li | H04L 12/4675 709/220 |
| 2017/0195210 A1* | 7/2017 | Jacob | H04L 45/74 |
| 2018/0309594 A1* | 10/2018 | Uttaro | H04L 69/321 |

* cited by examiner

*Primary Examiner* — Candal Elpenord
(74) *Attorney, Agent, or Firm* — Harrity & Harrity, LLP (57) ABSTRACT

A first network device may generate a layer-3 virtual private network (L3VPN) route advertisement associated with the first network device. The L3VPN route advertisement may include a first portion, associated with a second network device included in an L3VPN with the first network device, for separate transport-layer tunnel and service-layer tunneling, and a second portion, associated with the second network device, for collapsed transport-layer and service-layer tunneling. The first network device may transmit the L3VPN route advertisement.

20 Claims, 8 Drawing Sheets

600 →

610 — Generate a layer-3 virtual private network (L3VPN) route advertisement associated with the first network device wherein the L3VPN route advertisement comprises a first portion, associated with a second network device included in an L3VPN with the first network device, for separate transport-layer tunnel and service-layer tunneling, and a second portion, associated with the second network device, for collapsed transport-layer and service-layer tunneling, wherein the second portion of the L3VPN route advertisement comprises information identifying a transport encapsulation attribute (TEA) associated with a collapsed transport-layer and service-layer tunnel that terminates in a virtual routing and forwarding (VRF) instance associated with the second network device 620 — Transmit the L3VPN route advertisement

INTEROPERABILITY BETWEEN SEPARATE AND COLLAPSED SERVICE-LAYER AND TRANSPORT-LAYER TUNNELS

RELATED APPLICATION

This application claims priority under 35 U.S.C. § 119 to U.S. Provisional Patent Application No. 62/818,532, filed on Mar. 14, 2019, the content of which is incorporated by reference herein in its entirety.

BACKGROUND

A tunneling protocol is a type of communications protocol that permits network devices to transmit traffic from one network to another via a tunnel. The tunnel may permit the network devices to share private network communications across a public network, such as the Internet, through the use of encapsulation.

SUMMARY

According to some implementations, a first network device may include one or more memories, and one or more processors to generate a layer-3 virtual private network (L3VPN) route advertisement associated with the first network device, wherein the L3VPN route advertisement comprises a first portion, associated with a second network device included in an L3VPN with the first network device, for separate transport-layer tunnel and service-layer tunneling, and a second portion, associated with the second network device, for collapsed transport-layer and service-layer tunneling; and transmit the L3VPN route advertisement.

According to some implementations, a non-transitory computer-readable medium may store one or more instructions. The one or more instructions, when executed by one or more processors of a first network device, may cause the one or more processors to generate an L3VPN route advertisement associated with the first network device, wherein the L3VPN route advertisement comprises a first portion, associated with a second network device included in an L3VPN with the first network device, for separate transport-layer tunnel and service-layer tunneling, wherein the first portion of the L3VPN route advertisement comprises at least one of information identifying a route distinguisher (RD) prefix associated with the L3VPN, information identifying an address associated with the second network device, and information identifying an L3VPN label associated with the second network device, and a second portion, associated with the second network device, for collapsed transport-layer and service-layer tunneling; and transmit the L3VPN route advertisement.

According to some implementations, a method may include generating, by a first network device, an L3VPN route advertisement associated with the first network device, wherein the L3VPN route advertisement comprises a first portion, associated with a second network device included in an L3VPN with the first network device, for separate transport-layer tunnel and service-layer tunneling, and a second portion, associated with the second network device, for collapsed transport-layer and service-layer tunneling, wherein the first portion of the L3VPN route advertisement comprises information identifying a transport encapsulation attribute (TEA) associated with a collapsed transport-layer and service-layer tunnel that terminates in a virtual routing and forwarding (VRF) instance associated with the second network device; and transmitting, by the first network device, the L3VPN route advertisement.

DETAILED DESCRIPTION

The following detailed description of example implementations refers to the accompanying drawings. The same reference numbers in different drawings may identify the same or similar elements.

A network device (e.g., a provider edge device) included in a virtual private network (VPN) may communicate with another provider edge device included in another VPN using one or more tunnels. In some cases, a provider edge device may support a particular type of tunneling. For example, a provider edge device may support tunneling via a transport-layer tunnel (e.g., a tunnel between provider edge devices in different VPNs) and a service-layer tunnel (e.g., a tunnel between a provider edge device and a customer edge device in the same VPN), wherein the transport-layer tunnel and the service-layer tunnel are separate tunnels. As another example, a provider edge device may support tunneling via a collapsed transport-layer tunnel and service-layer tunnel. In some cases, network operators may want to operate a VPN that communicates with other VPNs that use different types of tunneling implementations, may want to transition a VPN from one tunneling implementation to another tunneling implementation, and/or the like. However, network operators may be unable to achieve interoperability between VPNs that use different tunneling implementations due to the incompatibility between the different tunneling implementations. This may cause a lack of flexibility in deploying VPNs, an increase in complexity in deploying VPNs, and/or the like.

Some implementations described herein provide a network device that is capable of interoperability between separate and collapsed service-layer and transport-layer tunnels and capable of advertising the interoperability to other network devices. The network device (e.g., a provider edge device) may generate a layer-3 virtual private network (L3VPN) route advertisement associated with the network device. The L3VPN route advertisement may include a first portion, associated with another network device (e.g., a customer edge device) included in an L3VPN with the network device, for separate transport-layer tunnel and service-layer tunneling, and a second portion, associated with the other network device, for collapsed transport-layer and service-layer tunneling. The network device may transmit the L3VPN route advertisement to other network devices included in the L3VPN and/or in other L3VPNs. In this way, the other network devices included in the L3VPN may use the information included in the L3VPN route advertisement to tunnel traffic to the network device via separate transport-layer tunnels and service-layer tunnels, via collapsed transport-layer and service-layer tunnels, and/or the like. This permits interoperability between network devices that use different tunneling implementations, which may increase flexibility in deploying VPNs, decrease complexity in deploying VPNs, and/or the like.

Figure 1A:
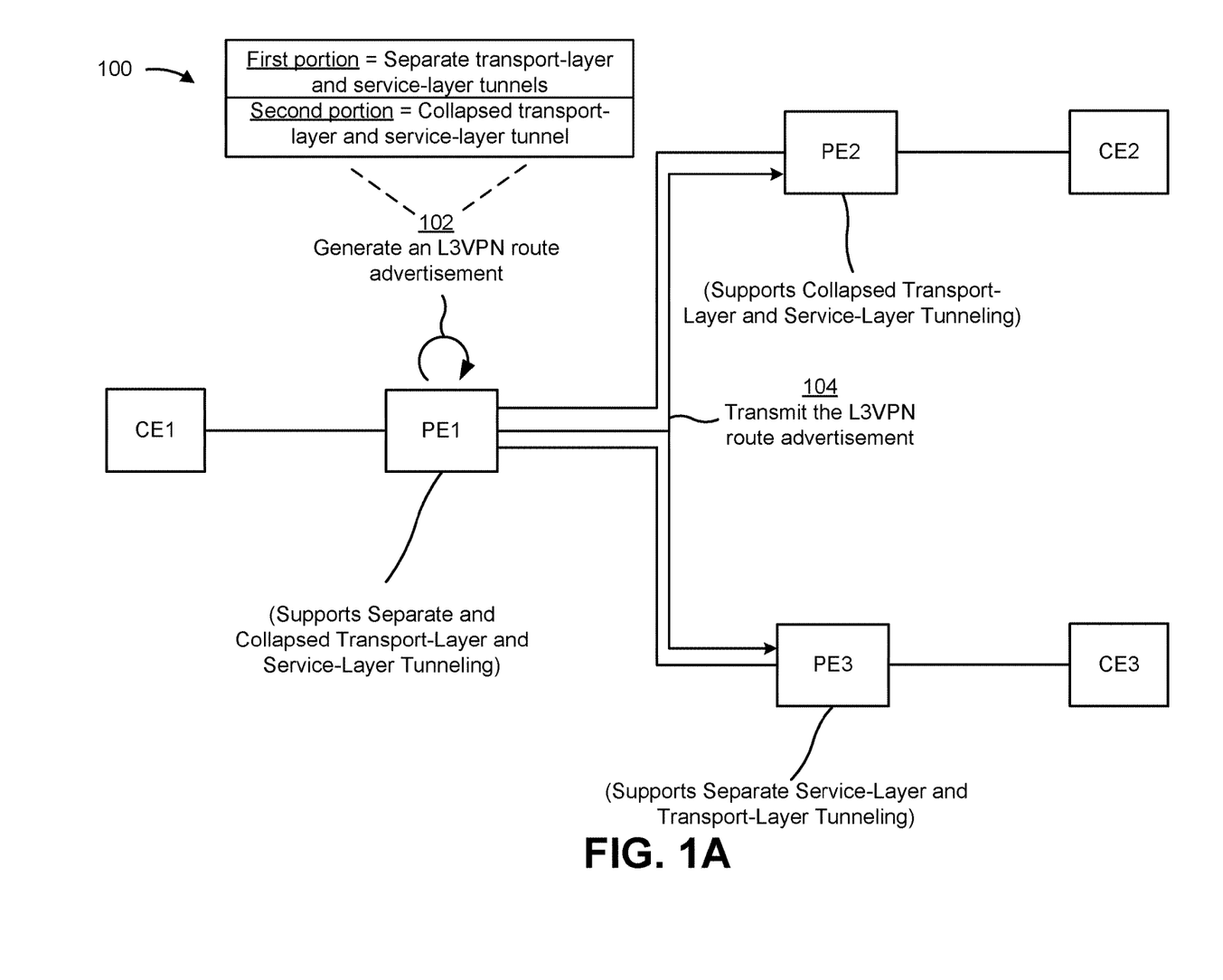
FIGS. 1A-1C are diagrams of an example implementation described herein.
Figure 1B:
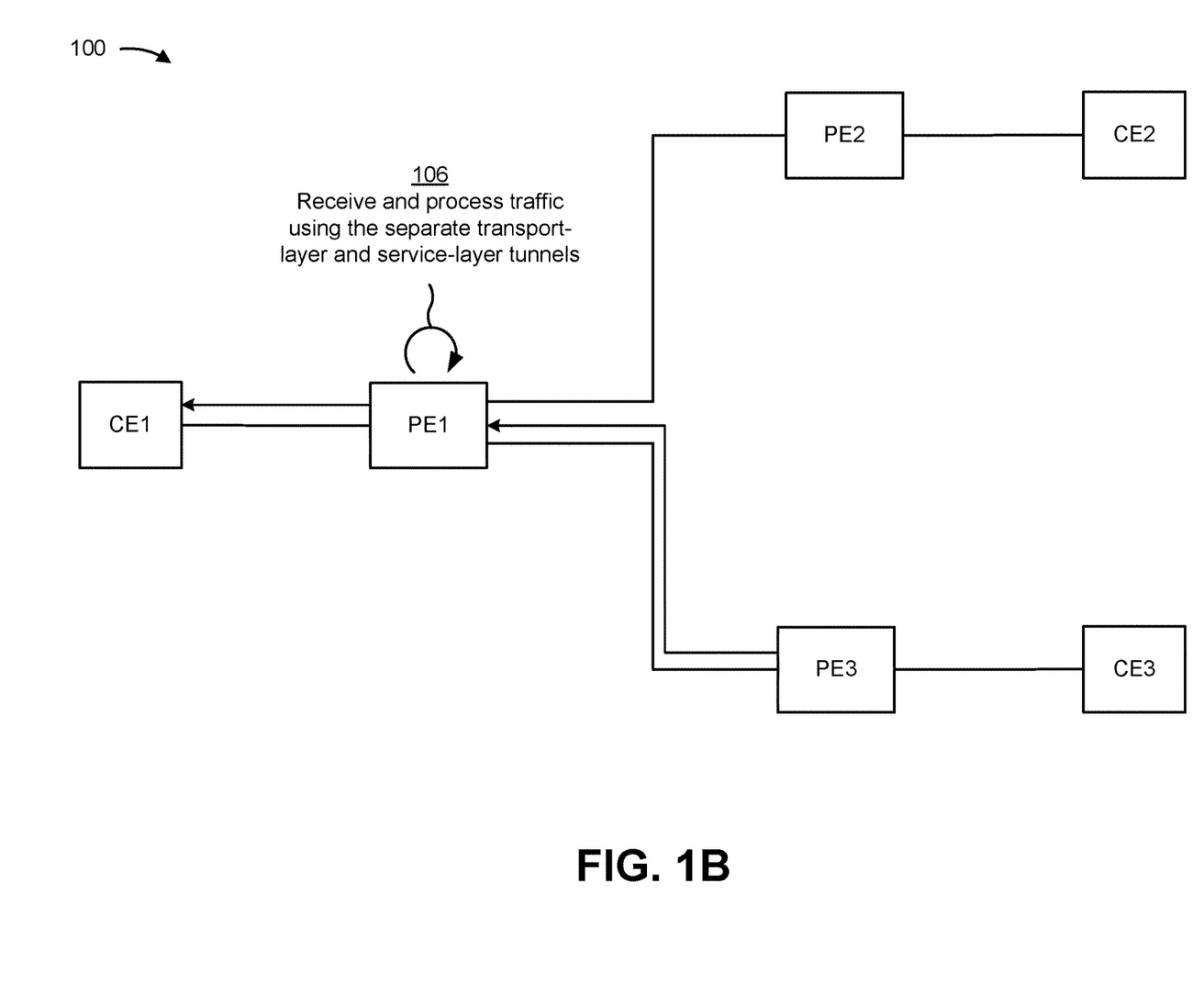
Figure 1C:
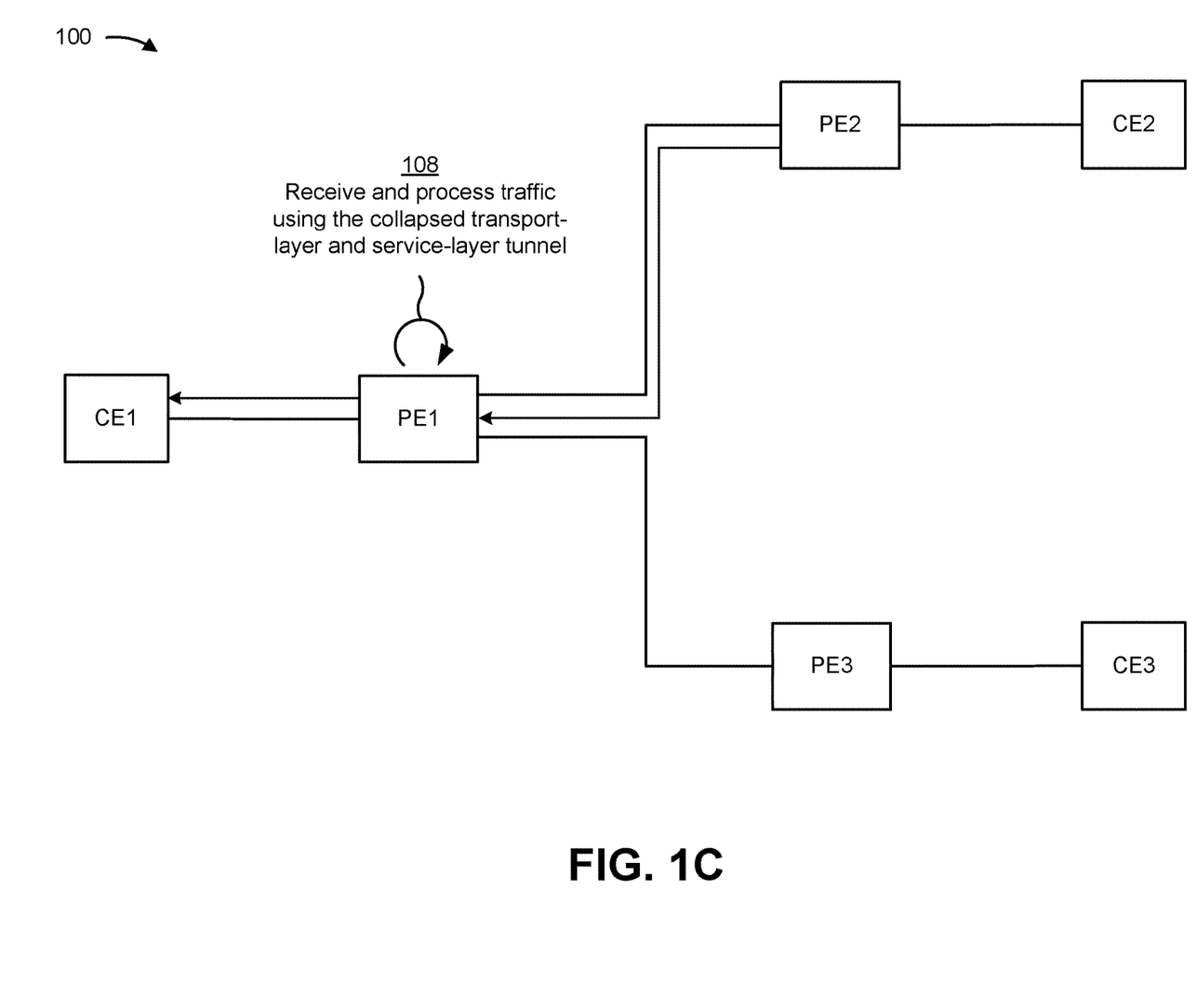

FIGS. 1A-1C are diagrams of an example implementation 100 described herein. As shown in FIGS. 1A-1C, example implementation 100 may include a plurality of network devices. The plurality of network devices may include a plurality of customer edge devices (e.g., CE1, CD2, CD3, and/or the like), a plurality of provider edge devices (e.g., PE1, PE2, PE3, and/or the like), and/or the like.

In some implementations, the plurality of network devices may be included in one or more VPNs. For example, CE1, CE2, CE3, PE1, PE2, and PE3 may all be included in the same L3VPN; CE1 and PE1 may be included in a first L3VPN, CE2 and PE2 may be included in a second L3VPN, and CE3 and PE3 may be included in a third L3VPN; and/or the like. In some implementations, the L3VPNs may be implemented using various VPN, routing, forwarding, tunneling, and/or switching protocols and/or techniques, such as multi-protocol label switching (MPLS), label distribution protocol (LDP), resource reservation protocol (RSVP), generic routing encapsulation (GRE), Internet protocol (IP) in IP protocol (IP in IP, or IPIP), and/or the like.

In some implementations, a network device included in an L3VPN may communicate with another network using one or more tunnels. In some implementations, a network device may support one or more types of tunneling.

For example, PE3 may include a network device that supports separate transport-layer and service-layer tunneling. In this case, PE3 may communicate with other network devices in the same L3VPN and/or other L3VPNs using a separated stack of tunneling layers. The separated stack of tunneling layers may include a transport-layer tunnel and a service-layer tunnel. PE3 may use the transport-layer tunnel to communicate with other provider edge network devices and may use the service-layer tunnel to communicate with customer edge network devices included in the L3VPN. In this case, the transport-layer tunnel, in the separated stack of tunneling layers, terminates at PE3 (i.e., terminates in a default instance associated with PE3). Accordingly, PE3 may receive a packet, destined for CE3, from another network device, may decapsulate an outer header of the packet and perform a lookup in the default routing instance associated with the PE3 to identify a virtual routing and forwarding (VRF) instance associated with CE3. PE3 may perform another lookup in the VRF instance associated with CE3 in order to forward the packet to CE3. In some implementations, a VRF instance may include an instance of a routing table, an MPLS table, a forwarding information base (FIB), a routing information base (RIB), and/or the like.

As another example, PE2 may include a network device that supports collapsed transport-layer and service-layer tunneling. In this case, PE2 may communicate with other network devices using a collapsed transport-layer and service-layer tunnel. The collapsed transport-layer and service-layer tunnel may include a tunnel that terminates at CE2 (i.e., in the VRF instance associated with CE2), such as a user datagram protocol (UDP) tunnel, an IP in IP tunnel, and/or the like. In this case, PE2 may not need to perform two separate lookups in order to forward a packet to CE2. Instead, PE2 may perform a single lookup in the VRF instance associated with CE2 to forward the packet to CE2.

In some implementations, PE1 may include a network device that supports both separate transport-layer and service-layer tunneling and collapsed transport-layer and service-layer tunneling. In this case, PE1 may be capable of forwarding packets to CE1 using a separate transport-layer tunnel and service-layer tunnel and/or a collapsed transport-layer tunnel and service-layer tunnel.

As shown in FIG. 1A, and by reference number 102, PE1 may generate an L3VPN route advertisement to advertise, to other network devices, PE1's capability for supporting both separate transport-layer and service-layer tunneling and collapsed transport-layer and service-layer tunneling. The L3VPN route advertisement may include a first portion and a second portion. The first portion may be for advertising PE1's capability for forwarding traffic to CE1 via separate transport-layer tunnel and service-layer tunneling. The second portion may be for advertising PE1's capability for forwarding traffic to CE1 via collapsed transport-layer tunnel and service-layer tunneling.

The first portion may include information identifying a protocol next hop associated with CE1 and an L3VPN label (e.g., an MPLS label or another type of label) associated with CE1. In some implementations, the L3VPN label may be associated with a service-layer tunnel (e.g., a tunnel from PE1 to CE1) such as an MPLS tunnel and/or the like. In some implementations, the protocol next hop, associated CE1, may be associated with a transport-layer tunnel (e.g., a GRE tunnel, an RSVP tunnel, an LDP tunnel, and/or the like) that terminates at PE1 (i.e., that terminates in a default routing instance associated with PE1 and outside of the VRF instance associated with CE1). The information identifying the protocol next hop associated with CE1 may include a route distinguisher (RD) prefix associated with the L3VPN and an address (e.g., an IP version 4 (IPv4) address, an IP version 6 (IPv6) address, and/or the like). The RD prefix of the L3VPN may be an address qualifier that may be used by network devices to distinguish between addresses associated with network devices included in the L3VPN and addresses associated with network devices included in other L3VPNs.

The second portion may include information identifying a tunnel encapsulation attribute (TEA) associated with the collapsed transport-layer and service-layer tunnel. In some implementations, the collapsed transport-layer and service-layer tunnel may be associated with CE1 in that CE1 may be a remote endpoint of the collapsed transport-layer and service-layer tunnel. In this case, the collapsed transport-layer and service-layer tunnel may terminate in the VRF instance associated with CE1. In some implementations, the TEA associated with the collapsed transport-layer and service-layer may include a packet that includes a type-length-value (TLV) field. A type field, of the TLV field, may identify a collapsed transport-layer and service-layer tunnel type of the collapsed transport-layer and service-layer tunnel (e.g., an IP in IP tunnel, a UDP tunnel, and/or the like). A length field, of the TLV field, may indicate a length of the value field of the TLV field.

The value field may include one or more sub-TLV fields associated with the collapsed transport-layer and service-layer tunnel. Each sub-TLV field, of the one or more sub-TLV fields, may specify one or more parameters for the collapsed transport-layer and service-layer tunnel. For example, a sub-TLV field may include information identifying one or more encapsulation header parameters for packets that are transmitted via the collapsed transport-layer and service-layer tunnel. As another example, a sub-TLV field may include information identifying a remote endpoint for the collapsed transport-layer and service-layer tunnel. In this case, the sub-TLV field may include information identifying CE1. As another example, a sub-TLV field may include information indicating that network devices using a collapsed transport-layer and service-layer tunnel are to ignore and/or not use the L3VPN label associated with CE1 when transmitting traffic to CE1.

As further shown in FIG. 1A, and by reference number 104, PE1 may transmit the L3VPN route advertisement to one or more other network devices, such as PE2 and PE3. In some implementations, PE1 may transmit the L3VPN route advertisement based on generating the L3VPN route advertisement. In some implementations, PE1 may transmit the L3VPN route advertisement based on receiving an L3VPN route advertisement from another network device, based on receiving a request for the L3VPN route advertisement, and/or the like.

As shown in FIG. 1B, and by reference number 106, PE1 may receive and process traffic received from another network device using the separate transport-layer and service layer-tunnels (e.g., PE3). PE3 may receive the L3VPN route advertisement from PE1 and may transmit traffic to CE1 based on the first portion of the L3VPN route advertisement. For example, PE3 identify, in the first portion, the RD prefix associated with the L3VPN, the address associated with CE1, and the L3VPN label associated with CE1. PE3 may transmit traffic using the RD prefix, the address, and the L3VPN label.

PE1 may receive the traffic, may decapsulate an outer header of a packet included in the traffic, and may perform (e.g., based on identifying the RD prefix associated with the L3VPN and the address associated with CE1) a lookup in the default routing instance associated with the PE1 to identify a VRF instance associated with CE1. PE1 may perform (e.g., based on the L3VPN label associated with CE1) another lookup in the VRF instance associated with CE1, and may forward the packet (and the remaining traffic) to CE1 based on performing the lookup in the VRF instance associated with CE1.

As shown in FIG. 1C, and by reference number 108, PE1 may receive and process traffic received from another network device using the collapsed transport-layer and service layer-tunnel (e.g., PE2). PE2 may receive the L3VPN route advertisement from PE1 and may transmit traffic to CE1 based on the second portion of the L3VPN route advertisement. For example, PE2 may identify, in the second portion, the TEA associated with the collapsed transport-layer and service layer-tunnel. PE2 may identify the collapsed transport-layer and service layer-tunnel type, associated with the collapsed transport-layer and service layer-tunnel, specified in the TLV field included in the TEA. PE2 may further identify the one or more parameters, for the collapsed transport-layer and service layer-tunnel, specified in the one or more sub-TLV fields included in the TLV field. PE2 may transmit traffic based on the collapsed transport-layer and service layer-tunnel type and the one or more parameters (e.g., PE2 may ignore the L3VPN label, associated with CE1, when transmitting traffic to CE1 via the collapsed transport-layer and service-layer tunnel based on the sub-TLV field indicating to ignore the L3VPN label, associated with CE1, when transmitting traffic to CE1 via the collapsed transport-layer and service-layer tunnel).

PE1 may receive the traffic, may decapsulate a header of a packet included in the traffic (e.g., based on the one or more encapsulation header parameters for the collapsed transport-layer and service-layer tunnel specified in a sub-TLV field), may perform (e.g., based on the remote endpoint specified in another sub-TLV field) a lookup in the VRF instance associated with the CE1, and may forward the packet (and the remaining traffic) to CE1 based on performing the lookup in the VRF instance associated with CE1.

In some implementations, PE1 may support multiple VRFs. To support multiple VRFs, may use various techniques to demultiplex traffic that is transmitted via the collapsed transport-layer and service-layer tunnel to CE1. For example, PE1 may use an input filter to decapsulate the packets included in the traffic and then perform a route lookup in the CE1 VRF on PE1. As another example, a decapsulation route may be configured on PE1 with an identifier associated with CE1 VRF. A firewall filter based IP in IP tunnel decapsulation may be supported on PE1. Firewall filters with decapsulation action may be implemented on interfaces located in the default routing instance of PE1 as well interfaces located in a virtual router. Firewall filters action to forward decapsulated traffic into a specified routing instance may also be implemented on PE1. If PE1 is to demultiplex into different VRF, an outer IP source/destination address and port may be used to map the traffic into the VRF of CE1.

In some implementations, the network devices that send traffic to PE1 may eventually be replaced with network devices that support collapsed transport-layer and service layer-tunnels, may eventually be upgraded to support collapsed transport-layer and service layer-tunnels, and/or the like. In this case, PE1 may continue to include the first portion in the L3VPN route advertisement, and the network devices may ignore the first portion (e.g., based on the sub-TLV in the TEA of the second portion that indicates to ignore the L3VPN label, associated with CE1, when transmitting traffic to CE1 via the collapsed transport-layer and service-layer tunnel) and use the second portion to transmit traffic to PE1. In some implementations, PE1 may continue to include the L3VPN label in the first portion, or may replace the L3VPN label with an implicit-null label.

In this way, a network device (e.g., PE1) may generate an L3VPN route advertisement associated with the network device. The L3VPN route advertisement may include a first portion, associated with another network device (e.g., CE1) included in an L3VPN with the network device, for separate transport-layer tunnel and service-layer tunneling, and a second portion, associated with the other network device, for collapsed transport-layer and service-layer tunneling. The network device may transmit the L3VPN route advertisement to other network devices (e.g., PE2, PE3, and/or the like). In this way, the other network devices may use the information included in the L3VPN route advertisement to tunnel traffic to the network device via separate transport-layer tunnels and service-layer tunnels, via collapsed transport-layer and service-layer tunnels, and/or the like. This permits interoperability between VPNs that use different tunneling implementations, which may increase flexibility in deploying VPNs, decrease complexity in deploying VPNs, and/or the like.

As indicated above, FIGS. 1A-1C are provided merely as one or more examples. Other examples may differ from what is described with regard to FIGS. 1A-1C.

Figure 2:
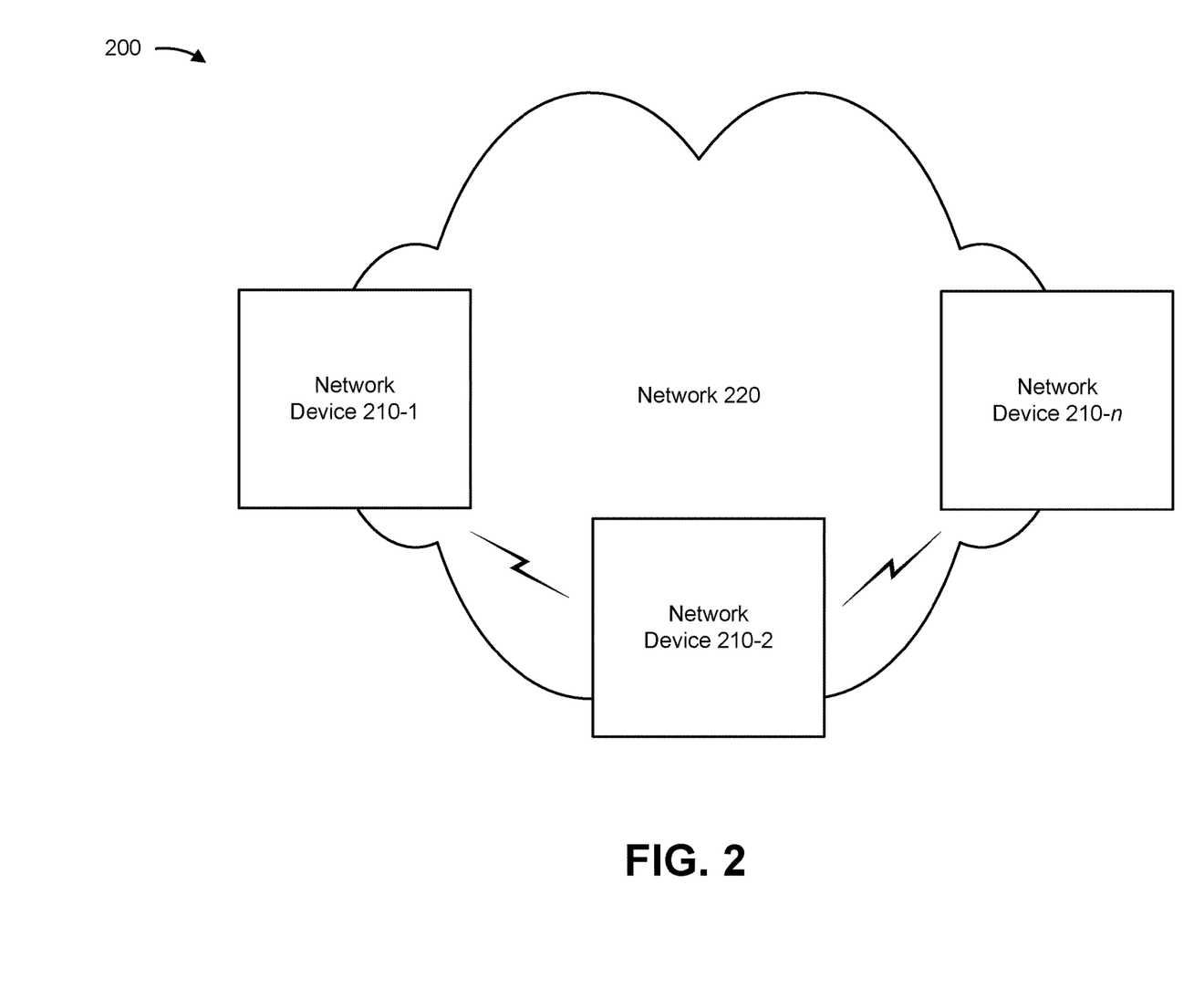
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network devices 210-1 through 210-n (n≥1) (hereinafter referred to collectively as "network devices 210," and individually as "network device 210") and a network 220. Devices of environment 200 may interconnect via wired connections, wireless connections, or a combination of wired and wireless connections.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center. In some implementations, network device 210 may include a provider edge device, a customer edge device, and/or the like.

In some implementations, network device 210 may generate an L3VPN route advertisement associated with network device 210. The L3VPN route advertisement may include a first portion, associated with another network device 210 included in an L3VPN with network device 210, for separate transport-layer tunnel and service-layer tunneling. The L3VPN may also include a second portion, associated with the other network device 210, for collapsed transport-layer and service-layer tunneling. Network device 210 may transmit the L3VPN route advertisement to the other network device 210 and/or other network devices 210.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of cellular network, etc.), a public land mobile network (PLMN), a LAN, a WAN, a metropolitan area network (MAN), a telephone network (e.g., a public switched telephone network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
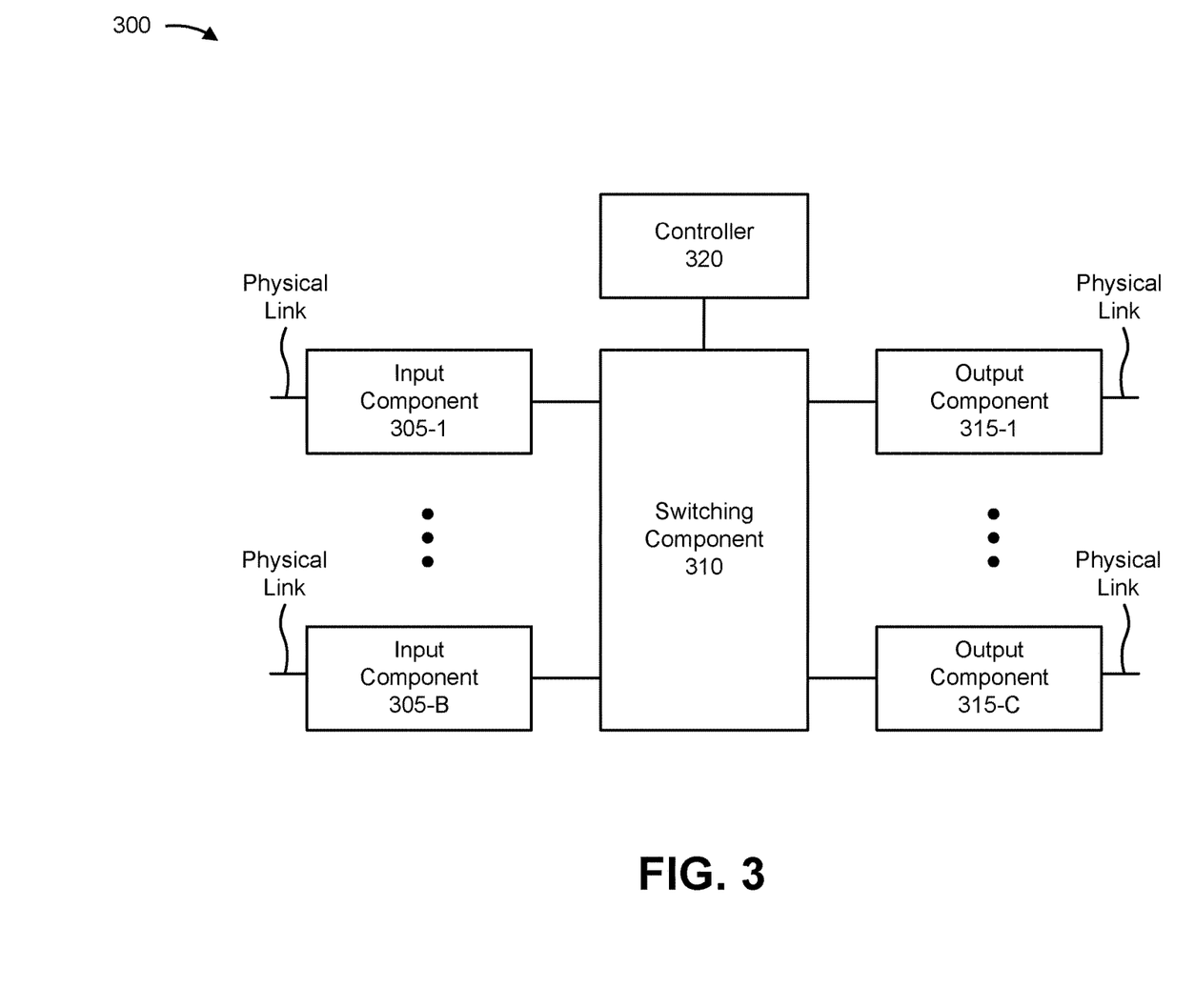
FIG. 3 is a diagram of example components of one or more devices of FIG. 2.

FIG. 3 is a diagram of example components of a device 300. Device 300 may correspond to one or more of network devices 210. In some implementations, one or more of network devices 210 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, and/or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. As used herein, a computer-readable medium is a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

As used herein, traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Figure 4:
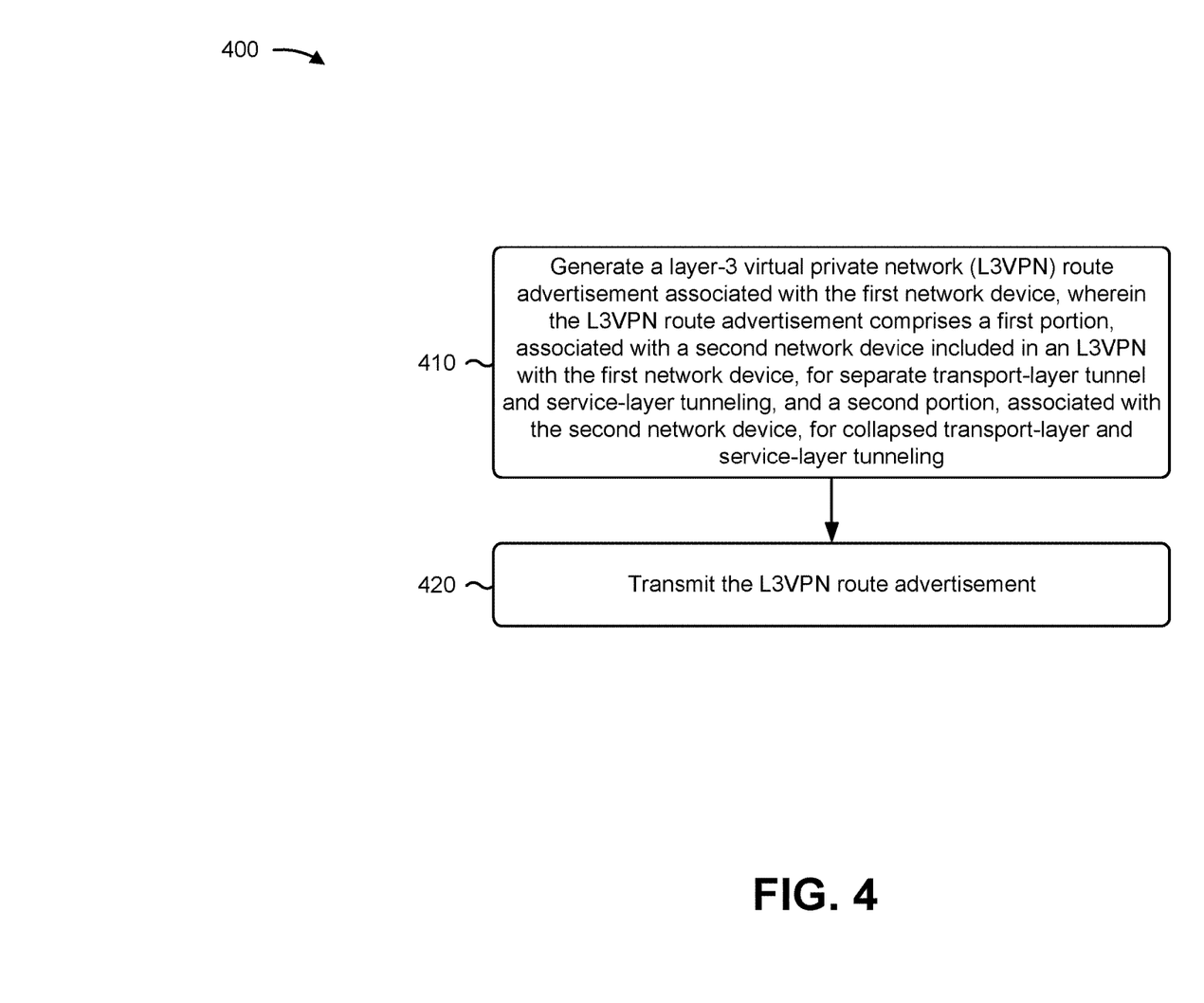
FIGS. 4-6 are flow charts of example processes for interoperability between separate and collapsed service-layer and transport-layer tunnels.

FIG. 4 is a flow chart of an example process 400 for interoperability between separate and collapsed service-layer and transport-layer tunnels. In some implementations, one or more process blocks of FIG. 4 may be performed by a first network device (e.g., a network device 210). In some implementations, one or more process blocks of FIG. 4 may be performed by another device or a group of devices separate from or including the first network device, such as another network device (e.g., another network device 210) and/or the like.

As shown in FIG. 4, process 400 may include generating an L3VPN route advertisement associated with the first network device, wherein the L3VPN route advertisement comprises a first portion, associated with a second network device included in an L3VPN with the first network device, for separate transport-layer tunnel and service-layer tunneling, and a second portion, associated with the second network device, for collapsed transport-layer and service-layer tunneling (block 410). For example, the first network device (e.g., using input component 305, switching component 310, output component 315, controller 320, and/or the like) may generate an L3VPN route advertisement associated with the first network device, as described above. In some implementations, the L3VPN route advertisement comprises a first portion, associated with a second network device included in an L3VPN with the first network device, for separate transport-layer tunnel and service-layer tunneling, and a second portion, associated with the second network device, for collapsed transport-layer and service-layer tunneling.

As further shown in FIG. 4, process 400 may include transmitting the L3VPN route advertisement (block 420). For example, the first network device (e.g., using input component 305, switching component 310, output component 315, controller 320, and/or the like) may transmit the L3VPN route advertisement, as described above.

Process 400 may include additional implementations, such as any single implementation or any combination of implementations described below and/or in connection with one or more other processes described elsewhere herein.

In some implementations, the first portion of the L3VPN route advertisement comprises information identifying an RD prefix associated with the L3VPN, information identifying an address associated with the second network device, and information identifying an L3VPN label associated with the second network device. In some implementations, the first portion of the L3VPN route advertisement is associated with a transport-layer tunnel, and the transport-layer tunnel terminates in a default routing instance associated with the first network device, and outside of a VRF instance associated with the second network device. In some implementations, the transport-layer tunnel comprises at least one of an LDP tunnel, an RSVP tunnel, or a GRE tunnel.

In some implementations, the first portion of the L3VPN route advertisement comprises information identifying an L3VPN label associated with the second network device. In some implementations, the second portion of the L3VPN route advertisement is associated with a collapsed transport-layer and service-layer tunnel that terminates in a VRF instance associated with the second network device. In some implementations, process 400 further comprises receiving, from a third network device and based on the second portion of the L3VPN route advertisement, traffic via the collapsed transport-layer and service-layer tunnel. In some implementations, the third network device is to ignore an L3VPN label, associated with the second network device, included in the first portion of the L3VPN route advertisement.

In some implementations, the collapsed transport-layer and service-layer tunnel comprises at least one of an IP in IP tunnel or a UDP tunnel. In some implementations, the second advertisement comprises information identifying a TEA associated with the collapsed transport-layer and service-layer tunnel. In some implementations, the TEA associated with the collapsed transport-layer and service-layer tunnel comprises a TLV field, the TLV field comprising a type field that includes information identifying a collapsed transport-layer and service-layer tunnel type of the collapsed transport-layer and service-layer tunnel, and a value field that includes one or more sub-TLV fields associated with the collapsed transport-layer and service-layer tunnel.

In some implementations, the one or more sub-TLV fields include information identifying one or more encapsulation header parameters for the collapsed transport-layer and service-layer tunnel. In some implementations, the one or more sub-TLV fields include information identifying a remote endpoint for the collapsed transport-layer and service-layer tunnel. In some implementations, process 400 further comprises receiving, from a third network device, traffic via a transport-layer tunnel; identifying, based on the first portion of the L3VPN route advertisement, a VRF instance associated with the second network device; and forwarding, based on identifying the VRF instance associated with the second network device, the traffic to the second network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
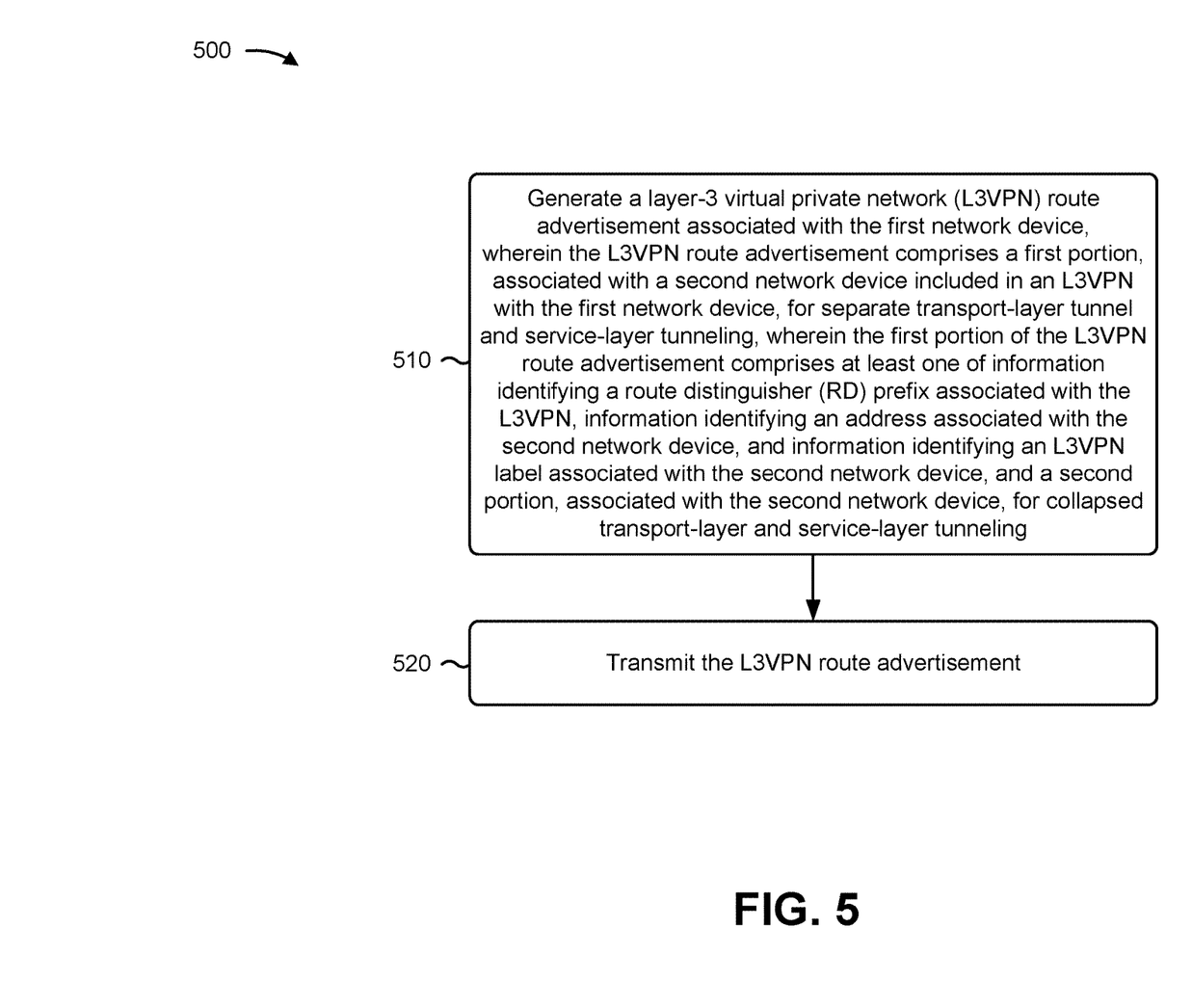

FIG. 5 is a flow chart of an example process 500 for interoperability between separate and collapsed service-layer and transport-layer tunnels. In some implementations, one or more process blocks of FIG. 5 may be performed by first network device (e.g., a network device 210). In some implementations, one or more process blocks of FIG. 5 may be performed by another device or a group of devices separate from or including the first network device, such as another network device (e.g., another network device 210) and/or the like.

As shown in FIG. 5, process 500 may include generating an L3VPN route advertisement associated with the first network device, wherein the L3VPN route advertisement comprises a first portion, associated with a second network device included in an L3VPN with the first network device, for separate transport-layer tunnel and service-layer tunneling, wherein the first portion of the L3VPN route advertisement comprises at least one of information identifying an RD prefix associated with the L3VPN, information identifying an address associated with the second network device, and information identifying an L3VPN label associated with the second network device and a second portion, associated with the second network device, for collapsed transport-layer and service-layer tunneling (block 510). For example, the first network device (e.g., using input component 305, switching component 310, output component 315, controller 320, and/or the like) may generate an L3VPN route advertisement associated with the first network device, as described above. In some implementations, the L3VPN route advertisement comprises a first portion, associated with a second network device included in an L3VPN with the first network device, for separate transport-layer tunnel and service-layer tunneling. In some implementations, the first portion of the L3VPN route advertisement comprises at least one of information identifying an RD prefix associated with the L3VPN, information identifying an address associated with the second network device, and information identifying an L3VPN label associated with the second network device, and a second portion, associated with the second network device, for collapsed transport-layer and service-layer tunneling.

As further shown in FIG. 5, process 500 may include transmitting the L3VPN route advertisement (block 520). For example, the first network device (e.g., using input component 305, switching component 310, output component 315, controller 320, and/or the like) may transmit the L3VPN route advertisement, as described above.

Process 500 may include additional implementations, such as any single implementation or any combination of implementations described below and/or in connection with one or more other processes described elsewhere herein.

In some implementations, the second portion of the L3VPN route advertisement comprises information identifying a TEA associated with the collapsed transport-layer and service-layer tunnel, the TEA comprising a TLV field, the TLV field comprising a type field that includes information identifying a collapsed transport-layer and service-layer tunnel type of the collapsed transport-layer and service-layer tunnel.

In some implementations, the TLV field comprises a value field that includes one or more sub-TLV fields associated with the collapsed transport-layer and service-layer tunnel, the one or more sub-TLV fields including information identifying at least one of one or more encapsulation header parameters for the collapsed transport-layer and service-layer tunnel or a remote endpoint for the collapsed transport-layer and service-layer tunnel.

In some implementations, the first portion of the L3VPN route advertisement is associated with a transport-layer tunnel, the transport-layer tunnel terminates in a default routing instance associated with the first network device and outside of a VRF instance associated with the second network device, and the transport-layer tunnel comprises at least one of an LDP tunnel, an RSVP tunnel, or a GRE tunnel.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
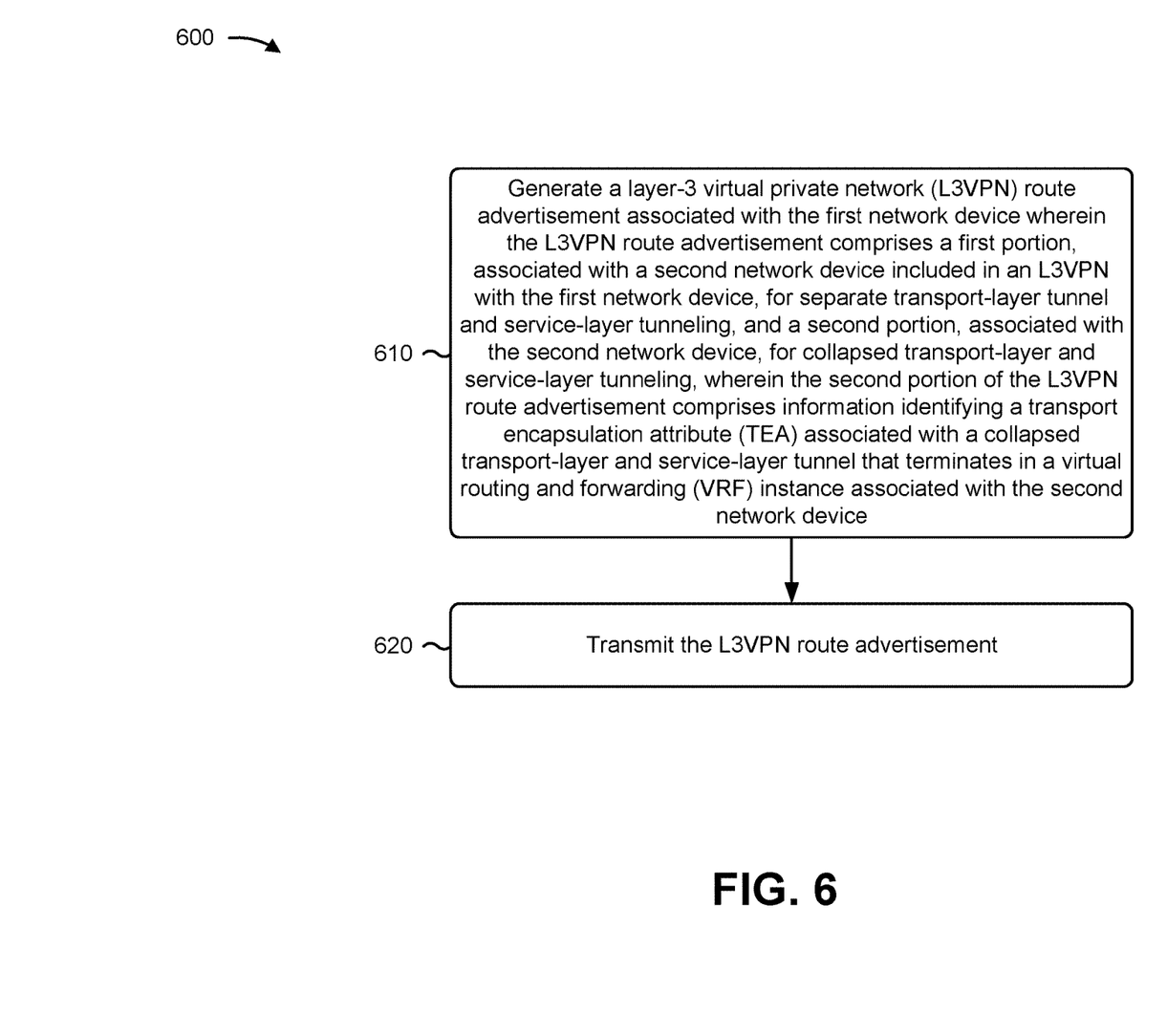

FIG. 6 is a flow chart of an example process 600 for interoperability between separate and collapsed service-layer and transport-layer tunnels. In some implementations, one or more process blocks of FIG. 6 may be performed by first network device (e.g., a network device 210). In some implementations, one or more process blocks of FIG. 6 may be performed by another device or a group of devices separate from or including the first network device, such as another network device (e.g., another network device 210) and/or the like.

As shown in FIG. 6, process 600 may include generating an L3VPN route advertisement associated with the first network device, wherein the L3VPN route advertisement comprises a first portion, associated with a second network device included in an L3VPN with the first network device, for separate transport-layer tunnel and service-layer tunneling, and a second portion, associated with the second network device, for collapsed transport-layer and service-layer tunneling, wherein the second portion of the L3VPN route advertisement comprises information identifying a TEA associated with a collapsed transport-layer and service-layer tunnel that terminates in a VRF instance associated with the second network device (block 610). For example, the first network device (e.g., using input component 305, switching component 310, output component 315, controller 320, and/or the like) may generate an L3VPN route advertisement associated with the first network device, as described above. In some implementations, the L3VPN route advertisement comprises a first portion, associated with a second network device included in an L3VPN with the first network device, for separate transport-layer tunnel and service-layer tunneling, and a second portion, associated with the second network device, for collapsed transport-layer and service-layer tunneling. In some implementations, the first portion of the L3VPN route advertisement comprises information identifying a TEA associated with a collapsed transport-layer and service-layer tunnel that terminates in a VRF instance associated with the second network device.

As further shown in FIG. 6, process 600 may include transmitting the L3VPN route advertisement (block 620). For example, the first network device (e.g., using input component 305, switching component 310, output component 315, controller 320, and/or the like) may transmit the L3VPN route advertisement, as described above.

Process 600 may include additional implementations, such as any single implementation or any combination of implementations described below and/or in connection with one or more other processes described elsewhere herein.

In some implementations, the first portion of the L3VPN route advertisement is associated with a transport-layer tunnel, the transport-layer tunnel terminates in a default routing instance associated with the first network device and outside of a VRF instance associated with the second network device, and the transport-layer tunnel comprises at least one of an LDP tunnel, an RSVP tunnel, or a GRE tunnel. In some implementations, the collapsed transport-layer and service-layer tunnel comprises at least one of an IP in IP tunnel or a UDP tunnel.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first network device, comprising:
   one or more memories; and
   one or more processors to:
      generate a layer-3 virtual private network (L3VPN) route advertisement associated with the first network device,
         wherein the L3VPN route advertisement comprises:
            a first portion, associated with a second network device included in an L3VPN with the first network device, for separate transport-layer tunnel and service-layer tunneling,
               wherein the first portion of the L3VPN route advertisement is associated with a transport-layer tunnel,
                  wherein the transport-layer tunnel terminates in a default routing instance associated with the first network device and outside of a virtual routing and forwarding (VRF) instance associated with the second network device, and
            a second portion, associated with the second network device, for collapsed transport-layer and service-layer tunneling; and
         transmit the L3VPN route advertisement.

2. The first network device of claim 1, wherein the first portion of the L3VPN route advertisement comprises:
   information identifying a route distinguisher (RD) prefix associated with the L3VPN,
   information identifying an address associated with the second network device, and
   information identifying an L3VPN label associated with the second network device.

3. The first network device of claim 1, wherein the transport-layer tunnel comprises at least one of:
   a label distribution protocol (LDP) tunnel,
   a resource reservation protocol (RSVP) tunnel, or
   a generic routing encapsulation (GRE) tunnel.

4. The first network device of claim 1, wherein the first portion of the L3VPN route advertisement comprises:
   information identifying an L3VPN label associated with the second network device,
      wherein the L3VPN label, associated with the second network device, is to be
   used to identify the VRF instance associated with the second network device.

5. The first network device of claim 1, wherein the second portion of the L3VPN route advertisement is associated with a collapsed transport-layer and service-layer tunnel that terminates in the VRF instance associated with the second network device.

6. The first network device of claim 5, wherein the one or more processors are further to:
   receive, from a third network device and based on the second portion of the L3VPN route advertisement, traffic via the collapsed transport-layer and service-layer tunnel,
      wherein the third network device is to ignore an L3VPN label, associated with the second network device, included in the first portion of the L3VPN route advertisement.

7. The first network device of claim 5, wherein the collapsed transport-layer and service-layer tunnel comprises at least one of:
   an Internet protocol (IP) in IP tunnel, or
   a user datagram protocol (UDP) tunnel.

8. The first network device of claim 5, wherein the second portion of the L3VPN route advertisement comprises:
   information identifying a transport encapsulation attribute (TEA) associated with the collapsed transport-layer and service-layer tunnel.

9. The first network device of claim 8, wherein the TEA associated with the collapsed transport-layer and service-layer tunnel comprises:
   a type-length-value (TLV) field,
      wherein the TLV field comprises:
         a type field that includes information identifying a collapsed transport-layer and service-layer tunnel type of the collapsed transport-layer and service-layer tunnel, and
         a value field that includes one or more sub-TLV fields associated with the collapsed transport-layer and service-layer tunnel.

10. The first network device of claim 9, wherein the one or more sub-TLV fields include information identifying one or more encapsulation header parameters for the collapsed transport-layer and service-layer tunnel.

11. The first network device of claim 9, wherein the one or more sub-TLV fields include information identifying a remote endpoint for the collapsed transport-layer and service-layer tunnel.

12. The first network device of claim 1, wherein the one or more processors are further to:
receive, from a third network device, traffic via the transport-layer tunnel;
identify, based on the first portion of the L3VPN route advertisement, the VRF instance associated with the second network device; and
forward, based on identifying the VRF instance associated with the second network device, the traffic to the second network device.

13. The first network device of claim 1, wherein the first portion of the L3VPN route advertisement comprises an implicit-null label.

14. A non-transitory computer-readable medium storing instructions, the instructions comprising:
one or more instructions that, when executed by one or more processors of a first network device, cause the one or more processors to:
generate a layer-3 virtual private network (L3VPN) route advertisement associated with the first network device,
wherein the L3VPN route advertisement comprises:
a first portion, associated with a second network device included in an L3VPN with the first network device, for separate transport-layer tunnel and service-layer tunneling, wherein the first portion of the L3VPN route advertisement comprises at least one of: information identifying a route distinguisher (RD) prefix associated with the L3VPN, information identifying an address associated with the second network device, or information identifying an L3VPN label associated with the second network device, wherein the first portion of the L3VPN route advertisement is associated with a transport-layer tunnel, wherein the transport-layer tunnel terminates in a default routing instance associated with the first network device and outside of a virtual routing and forwarding (VRF) instance associated with the second network device, and
a second portion, associated with the second network device, for
collapsed transport-layer and service-layer tunneling; and
transmit the L3VPN route advertisement.

15. The non-transitory computer-readable medium of claim 14, wherein the second portion of the L3VPN route advertisement comprises:
information identifying a transport encapsulation attribute (TEA) associated with the collapsed transport-layer and service-layer tunnel,
wherein the TEA associated with the collapsed transport-layer and service-layer tunnel comprises:
a type-length-value (TLV) field,
wherein the TLV field comprises: a type field that includes information identifying a collapsed transport-layer and service-layer tunnel type of the collapsed transport-layer and service-layer tunnel.

16. The non-transitory computer-readable medium of claim 15, wherein the TLV field further comprises:
a value field that includes one or more sub-TLV fields associated with the collapsed transport-layer and service-layer tunnel,
wherein the one or more sub-TLV fields include information identifying at least one of:
one or more encapsulation header parameters for the collapsed transport-layer and service-layer tunnel, or
a remote endpoint for the collapsed transport-layer and service-layer tunnel.

17. The non-transitory computer-readable medium of claim 14,
wherein the transport-layer tunnel comprises at least one of:
a label distribution protocol (LDP) tunnel,
a resource reservation protocol (RSVP) tunnel, or
a generic routing encapsulation (GRE) tunnel.

18. A method, comprising:
generating, by a first network device, a layer-3 virtual private network (L3VPN) route advertisement associated with the first network device,
wherein the L3VPN route advertisement comprises:
a first portion, associated with a second network device included in an L3VPN with the first network device, for separate transport-layer tunnel and service-layer tunneling,
wherein the first portion of the L3VPN route advertisement is associated with a transport-layer tunnel, wherein the transport-layer tunnel terminates in a default routing instance associated with the first network device and outside of a virtual routing and forwarding (VRF) instance associated with the second network device, and
a second portion, associated with the second network device, for collapsed transport-layer and service-layer tunneling,
wherein the second portion of the L3VPN route advertisement comprises: information identifying a transport encapsulation attribute (TEA) associated with a collapsed transport-layer and service-layer tunnel that terminates in the VRF instance associated with the second network device; and
transmitting, by the first network device, the L3VPN route advertisement.

19. The method of claim 18,
wherein the transport-layer tunnel comprises at least one of:
a label distribution protocol (LDP) tunnel,
a resource reservation protocol (RSVP) tunnel, or
a generic routing encapsulation (GRE) tunnel.

20. The method of claim 18, wherein the collapsed transport-layer and service-layer tunnel comprises at least one of:
an Internet protocol (IP) in IP tunnel, or
a user datagram protocol (UDP) tunnel.

* * * * *